(12) United States Patent
Satou et al.

(10) Patent No.: US 8,065,065 B2
(45) Date of Patent: Nov. 22, 2011

(54) LOCK-UP CONTROL FOR TORQUE CONVERTER

(75) Inventors: Katsunori Satou, Sagamihara (JP); Masaya Kubota, Fuji (JP); Hiroyuki Takenaka, Yamato (JP); Kan Yagi, Fuji (JP); Seiji Totsuka, Kakegawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 504 days.

(21) Appl. No.: 12/139,709

(22) Filed: Jun. 16, 2008

(65) Prior Publication Data

US 2008/0312800 A1    Dec. 18, 2008

(30) Foreign Application Priority Data

Jun. 18, 2007 (JP) ................. 2007-160437

(51) Int. Cl.
*G06F 17/00* (2006.01)
*G06F 19/00* (2011.01)
(52) U.S. Cl. ............... 701/68; 701/51; 701/58
(58) Field of Classification Search ........... 701/51, 701/55, 56, 58, 66–68; 192/3.21; 477/5
See application file for complete search history.

(56) References Cited

U.S. PATENT DOCUMENTS

| 4,509,124 A | * | 4/1985 | Suzuki et al. ............ 701/65 |
| 4,940,122 A | * | 7/1990 | Fujieda ............ 192/3.31 |
| 5,667,458 A | * | 9/1997 | Narita et al. ............ 477/169 |
| 6,066,069 A | * | 5/2000 | Vorndran ............ 477/38 |
| 6,139,472 A |   | 10/2000 | Harada et al. |

FOREIGN PATENT DOCUMENTS

| EP | 1 426 661 A2 | 6/2004 |
| JP | 2004-324847 A | 11/2004 |

* cited by examiner

*Primary Examiner* — Hussein A. Elchanti
(74) *Attorney, Agent, or Firm* — Foley & Lardner LLP

(57) ABSTRACT

A lock-up control system including a lock-up differential pressure generator and a controller that is programmed to: when increasing a lock-up differential pressure command value with time to establish the lock-up state of the torque converter, switch a gradient of the lock-up differential pressure command value from a first gradient to a predetermined gradient larger than the first gradient when an actual slip rotation speed is decreased to a predetermined slip rotation speed value or less; and switch the gradient of the lock-up differential pressure command value from the predetermined gradient to a second gradient smaller than the predetermined gradient when the actual slip rotation speed exceeds the predetermined slip rotation speed value again after being decreased to the predetermined slip rotation speed value or less.

18 Claims, 3 Drawing Sheets

US 8,065,065 B2

LOCK-UP CONTROL FOR TORQUE CONVERTER

BACKGROUND OF THE INVENTION

The present invention relates to a lock-up control system for a torque converter provided in a power train such as an automatic transmission including a continuously variable transmission. Specifically, the present invention relates to a torque converter lock-up control system that shifts the torque converter from a converter state in which a relative rotation speed between input and output elements of the torque converter, that is, an actual slip rotation speed of the torque converter is not restricted, or from a slip control state in which the actual slip rotation speed is limited to that conforming with a target slip rotation speed, to a lock-up state in which the input and output elements are directly coupled to each other and the actual slip rotation speed is zero.

A torque converter conducts power transmission between the input and output elements via fluid to thereby perform a torque fluctuation absorption function and a torque multiplication function but have a reduced torque transmission efficiency. For the reasons discussed above, recently, automotive vehicles often use a lock-up torque converter in which the input and output elements (pump and turbine elements) can be directly coupled with each other by a lock-up clutch under engine/vehicle operating conditions that do not require the torque fluctuation absorption function and the torque multiplication function, or a slip rotation speed of the lock-up torque converter, that is, a speed difference between the input and output elements can be restricted by slip control of the lock-up clutch depending on engine/vehicle operating conditions.

Japanese Patent Provisional Publication No. 2004-324847 discloses a lock-up control device as a conventionally known lock-up control technology. In the conventional lock-up control device, an actual slip rotation speed of a torque converter is gradually decreased by advancing engagement of a lock-up clutch that is disposed between input and output elements of the torque converter. After the actual slip rotation speed is decreased to a predetermined value, a lock-up differential pressure command value (a lock-up control command value) for controlling engagement operation of the lock-up clutch is abruptly and stepwisely changed so as to promote shifting of the torque converter to the lock-up state and reduce a lock-up time required to achieve the lock-up state.

Referring to FIG. 3, the conventional lock-up control is explained. As shown in FIG. 3, at moment t1, accelerator opening (accelerator position) APO of an accelerator is increased by depressing the accelerator pedal as indicated by solid line to thereby increase engine torque Te as indicated by broken line. At this moment t1, an operating region of the torque converter is shifted from a converter region in which an actual slip rotation speed of the torque converter should not be restricted, to a lock-up region in which the actual slip rotation speed of the torque converter should be decreased to zero.

Upon the transition from the converter region to the lock-up region, at moment t1, the lock-up differential pressure command value for the lock-up clutch is stepwisely increased in order to reduce backlash of the lock-up clutch. After moment t1, the lock-up differential pressure command value is gradually increased at a predetermined rate of change with time by feedback control or feedforward control such that actual slip rotation speed |Ne−Nt| of the torque converter is gradually decreased at a target gradient with respect to time which is set so as to suppress occurrence of a lock-up shock. Actual slip rotation speed |Ne−Nt| of the torque converter is given as a speed difference between engine speed Ne, i.e., torque converter input rotation speed Ne, and turbine rotation speed Nt, i.e., torque converter output rotation speed Nt.

By conducting the lock-up control on the basis of the lock-up differential pressure command value, engagement of the lock-up clutch proceeds at a rate corresponding to the change in the lock-up differential pressure command value, so that actual slip rotation speed |Ne−Nt| of the torque converter is decreased as shown in FIG. 3. At moment t2, actual slip rotation speed |Ne−Nt| of the torque converter reaches predetermined slip rotation speed value ΔNs that is set in order to judge whether actual slip rotation speed |Ne−Nt| of the torque converter becomes equal to a slip rotation speed at which a considerably large engagement shock does not occur even when the engagement of the lock-up clutch abruptly proceeds. At moment t3 at which predetermined time period Δt set for stabilizing the lock-up control has elapsed from moment t2, the lock-up differential pressure command value is rapidly and stepwisely increased to a maximum value as an upper limit as indicated by two-dot chain line "a" in FIG. 3.

By thus stepwisely and rapidly increasing the lock-up differential pressure command value, the engagement of the lock-up clutch can abruptly proceed so that the actual slip rotation speed can be rapidly decreased toward zero to thereby correspondingly reduce the lock-up time. Further, even when the engagement of the lock-up clutch abruptly proceeds, actual slip rotation speed |Ne−Nt| is not more than predetermined slip rotation speed value ΔNs, whereby the engagement shock does not become considerably large.

SUMMARY OF THE INVENTION

In a case where accelerator opening APO and engine torque Te are increased by depressing the accelerator pedal at moment t4 subsequent to moment t3 at which the lock-up differential pressure command value is stepwisely raised as indicated by two-dot chain line "a" in FIG. 3, a rise in engine speed Ne may be caused to thereby increase actual slip rotation speed |Ne−Nt| beyond predetermined slip rotation speed value ΔNs again. Under this circumstance, in the conventional lock-up control, the lock-up differential pressure command value is kept at the raised value as indicated by two-dot chain line "a" in FIG. 3. The engagement operation of the lock-up clutch is allowed to rapidly proceed so that actual slip rotation speed |Ne−Nt| is abruptly changed from the value higher than predetermined slip rotation speed value ΔNs to zero. This might cause a large engagement shock, namely, a lock-up shock.

In order to solve the above-discussed problem, it may be considered that the engagement operation of the lock-up clutch is suppressed by rapidly dropping the raised lock-up differential pressure command value as indicated by alternate long and short dash line "b1" in FIG. 3 at moment t5 at which actual slip rotation speed |Ne−Nt| exceeds predetermined slip rotation speed value ΔNs. However, an actual lock-up differential pressure is generated with a time delay in responding to output of the lock-up differential pressure command value. Therefore, even when the lock-up differential pressure command value is rapidly dropped at moment t5 as indicated by alternate long and short dash line "b1" in FIG. 3, there will occur overshoot in actual lock-up differential pressure |Pa−Pr| as indicated by broken line "b2" in FIG. 3.

Due to the overshoot in the actual lock-up differential pressure |Pa−Pr|, the engagement operation of the lock-up clutch cannot be desirably suppressed and rapid decrease in engine speed Ne is caused as indicated by alternate long and short dash line "b3" in FIG. 3. Therefore, actual slip rotation speed |Ne−Nt| is rapidly reduced from the value not less than predetermined slip rotation speed value ΔNs as indicated by alternate long and short dash line "b4" in FIG. 3. Then, abrupt change in vehicular forward or rearward acceleration G is caused as indicated by alternate long and short dash line "b5" in FIG. 3. That is, there occurs a considerably large shock.

Accordingly, as long as stepwisely raising the lock-up differential pressure command value as indicated by two-dot chain line "a" in FIG. 3 in response to decrease of actual slip rotation speed |Ne−Nt| to predetermined slip rotation speed value ΔNs, the problem of a large engagement shock, i.e., lock-up shock, of the lock-up clutch inevitably occurs even by dropping the lock-up differential pressure command value as indicated by alternate long and short dash line "b1" in FIG. 3 when actual slip rotation speed |Ne−Nt| becomes larger than predetermined slip rotation speed value ΔNs at moment t5 due to increase in accelerator opening APO which is caused by depressing the accelerator pedal at moment t4.

In order to solve the above-discussed problem, it may be further considered that the lock-up differential pressure command value is increased to the maximum value with a small gradient as indicated by broken line c1 in FIG. 3, namely, at the same rate of change as that in a time period between moment t1 to moment t3, regardless of decrease of actual slip rotation speed |Ne−Nt| to predetermined slip rotation speed value ΔNs. However, in such a case, the engagement operation of the lock-up clutch is gradually carried out. When accelerator opening APO is increased by depressing the accelerator pedal at moment t4, engine speed Ne is increased at a rate with time as indicated by broken line c2 in FIG. 3 and actual slip rotation speed |Ne−Nt| is changed at a rate with time as indicated by broken line c3 in FIG. 3. As a result, the lock-up time required for bringing the lock-up clutch into the lock-up state, namely, for reducing actual slip rotation speed |Ne−Nt| to zero, is undesirably increased.

The present invention has been made to solve both the problem concerning the engagement shock of the lock-up clutch and the problem concerning the lock-up time. An object of the present invention is to provide a lock-up control system of a torque converter which is capable of reducing the engagement shock of the lock-up clutch and reducing the lock-up time.

In one aspect of the present invention, there is provided a lock-up control system which controls a lock-up clutch in a torque converter which is disposed between input and output elements of the torque converter, the lock-up control system bringing the torque converter into a lock-up state by controlling a lock-up differential pressure between a lock-up clutch apply pressure and a lock-up clutch release pressure, the lock-up control system comprising:

a lock-up differential pressure generator that generates the lock-up differential pressure in response to a lock-up differential pressure command value; and a controller that controls the lock-up differential pressure command value according to change in an actual slip rotation speed as a differential rotation speed between the input and output elements of the torque converter, the controller being programmed to:

when increasing the lock-up differential pressure command value with time to establish the lock-up state of the torque converter, switch a gradient of the lock-up differential pressure command value from a first gradient to a predetermined gradient that is larger than the first gradient, when the actual slip rotation speed is decreased to a predetermined slip rotation speed value or less; and switch the gradient of the lock-up differential pressure command value from the predetermined gradient to a second gradient that is smaller than the predetermined gradient, when the actual slip rotation speed exceeds the predetermined slip rotation speed value again after being decreased to the predetermined slip rotation speed value or less.

In a further aspect of the present invention, there is provided a method of controlling a lock-up clutch in a torque converter which is disposed between input and output elements of the torque converter, the torque converter being brought into a lock-up state by a control of a lock-up differential pressure between a lock-up clutch apply pressure and a lock-up clutch release pressure which is generated in response to a lock-up differential pressure command value, the method comprising:

when increasing the lock-up differential pressure command value with time to establish the lock-up state of the torque converter;

judging whether or not an actual slip rotation speed as a differential rotation speed between the input and output elements of the torque converter is decreased to a predetermined slip rotation speed value or less;

setting the lock-up differential pressure command value so as to provide a first gradient, until it is judged that the actual slip rotation speed is decreased to the predetermined slip rotation speed value or less;

setting the lock-up differential pressure command value so as to provide a predetermined gradient larger than the first gradient, when it is judged that the actual slip rotation speed is decreased to the predetermined slip rotation speed value or less; and setting the lock-up differential pressure command value so as to provide a second gradient smaller than the predetermined gradient, when it is judged that the actual slip rotation speed exceeds the predetermined slip rotation speed value again after setting the lock-up differential pressure command value so as to provide the predetermined gradient.

DETAILED DESCRIPTION OF THE INVENTION

Figure 1:
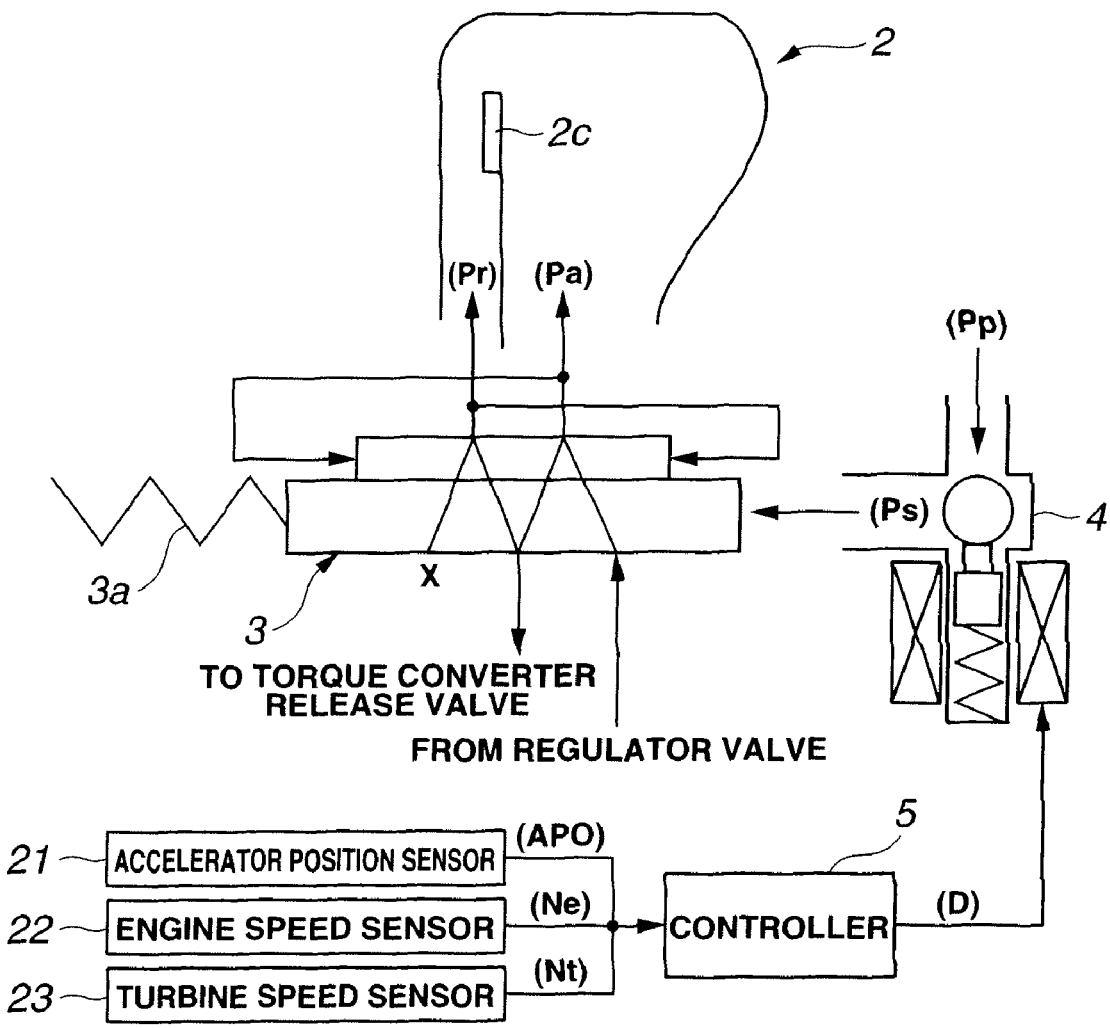
FIG. 1 is a system block diagram illustrating an embodiment of a lock-up control system for a torque converter, according to the present invention.

In the followings, an embodiment of the present invention will be described with reference to the accompanying drawings. FIG. 1 illustrates a lock-up control system for a torque converter, according to the embodiment of the present invention. In FIG. 1, torque converter 2 is schematically illustrated for the sake of simplicity. Torque converter 2 is a lock-up torque converter as generally known, which includes a pump impeller serving as a torque converter input element that is connected to an engine crankshaft and rotates in synchronism with rotation of the engine crankshaft, a turbine runner serving as a torque converter output element that is connected to an input shaft of a transmission gear train of an automatic transmission, and lock-up clutch 2c via which the pump impeller and the turbine runner are directly coupled to each other.

The magnitude of engagement force of lock-up clutch 2c is determined depending on differential pressure (Pa−Pr) between lock-up clutch apply pressure (hereinafter referred to as apply pressure) Pa which is applied in a direction of engagement of lock-up clutch 2c and lock-up clutch release pressure (hereinafter referred to as release pressure) Pr which is applied in a direction of release of lock-up clutch 2c. The differential pressure (Pa−Pr) means a lock-up clutch engagement pressure for lock-up clutch 2c, which is hereinafter referred to as a lock-up differential pressure (Pa−Pr).

When apply pressure Pa is lower than release pressure Pr, lock-up clutch 2c is released or disengaged and therefore torque converter 2 is operated in a converter state in which the pump impeller and the turbine runner are uncoupled to each other and thus slip control for the speed of relative rotation between the pump impeller and the turbine runner is not implemented, that is, the slip rotation speed of torque converter 2 is not made.

When apply pressure Pa is higher than release pressure Pr and lock-up differential pressure (Pa−Pr) is below a predetermined value, lock-up clutch 2c is engaged by the lock-up clutch engagement force corresponding to lock-up differential pressure (Pa−Pr). Under this condition, the relative rotation speed between the input and output elements of torque converter 2, that is, the slip rotation speed of torque converter 2 is controlled or adjusted depending on the magnitude of the lock-up clutch engagement force corresponding to lock-up differential pressure (Pa−Pr) Thus controlled state of torque converter 2 is hereinafter referred to as a slip control state of torque converter 2.

When lock-up differential pressure (Pa−Pr) exceeds the predetermined value, lock-up clutch 2c shifts to a fully engaged state in which there occurs no relative rotation between the input and output elements of torque converter 2. That is, in this condition, the slip rotation speed of torque converter 2 is zero. This non-slip rotation state of torque converter 2 is hereinafter referred to as a lock-up state of torque converter 2.

The magnitude of apply pressure Pa and the magnitude of release pressure Pr are controlled or regulated by means of slip control valve 3. Slip control valve 3 is designed to control or regulate apply pressure Pa and release pressure Pr in response to signal pressure Ps that is outputted from duty-cycle controlled lock-up solenoid valve 4. Slip control valve 3 and lock-up solenoid valve 4 are of generally known types as described below.

As illustrated in FIG. 1, lock-up solenoid valve 4 receives constant pilot pressure Pp that serves as an initial pressure via an inlet port thereof, and outputs signal pressure Ps from an outlet port thereof. Lock-up solenoid valve 4 is designed to generate signal pressure Ps such that the magnitude of signal pressure Ps increases with increase in solenoid-drive duty cycle value D that is outputted from controller 5.

On the other hand, slip control valve 3 includes a spool having one end to which signal pressure Ps from lock-up solenoid valve 4 and release pressure Pr fed back thereto are applied in one direction. Applied to the other end of the spool in an opposite direction are a spring force of spring 3a and apply pressure Pa fed back thereto. As signal pressure Ps from lock-up solenoid valve 4 is increased, lock-up differential pressure (Pa−Pr) between apply pressure Pa and release pressure Pr is gradually raised from a negative value to a positive value via "0" and further raised toward a larger positive value.

The negative value of lock-up differential pressure (Pa−Pr), which is represented by the inequality Pa<Pr, means that torque converter 2 is operated in the converter state. In contrast, the positive value of lock-up differential pressure (Pa−Pr), which is represented by the inequality Pa>Pr and less than a predetermined positive value, means that torque converter 2 is operated in the slip control state. Further, the positive value of lock-up differential pressure (Pa−Pr), which is represented by the inequality Pa>Pr and not less than the predetermined positive value, means that torque converter 2 is operated in the lock-up state.

As can be understood from the above explanation, when lock-up differential pressure (Pa−Pr) is increased from the negative value to the positive value less than the predetermined positive value, torque converter 2 is shifted from the converter state to the slip control state. In the slip control state, as the positive value of lock-up differential pressure (Pa−Pr) is increased within a pressure range below a predetermined threshold value, i.e., the predetermined positive value, the engagement capacity of lock-up clutch 2c is enhanced. That is, the engagement capacity of lock-up clutch 2c is increased in proportion to lock-up differential pressure (Pa−Pr). As the engagement capacity of lock-up clutch 2c is increased, the relative rotation speed between the input and output elements of torque converter 2, that is, the slip rotation speed of torque converter 2 is reduced. When lock-up differential pressure (Pa−Pr) is further increased and reaches the predetermined positive value, torque converter 2 is shifted from the slip control state to the lock-up state in which the slip rotation speed of torque converter 2 becomes zero.

As illustrated in FIG. 1, controller 5 receives input information from accelerator opening sensor 21, engine speed sensor 22 and turbine speed sensor 23. Accelerator opening sensor 21 detects accelerator opening APO which represents a load required of the engine, and generates a signal indicative of the detected accelerator opening APO. Engine speed sensor 22 detects engine speed Ne which is equal to torque converter input speed, and generates a signal indicative of the detected engine speed Ne. Turbine speed sensor 23 detects a rotational speed of the turbine runner, i.e., turbine speed Nt, which is equal to torque converter output speed, and generates a signal indicative of the detected turbine speed Nt. Controller 5 includes a microcomputer which has an input/output interface (I/O), a random access memory (RAM), a read-only memory (ROM), and a microprocessor or a central processing unit (CPU).

Controller 5 determines command value T1 of lock-up differential pressure (Pa−Pr), hereinafter referred to as lock-up differential pressure command value T1, on the basis of the above-described input information from accelerator opening sensor 21, engine speed sensor 22 and turbine speed sensor 23, and determines solenoid-drive duty cycle value D which corresponds to command value T1 of lock-up differential pressure (Pa−Pr). Controller 5 supplies solenoid-drive duty cycle value D to lock-up solenoid valve 4.

Controller 5 controls lock-up differential pressure command value T1 according to change in actual slip rotation speed |Ne−Nt| of torque converter 2 as explained later. Controller 5 further performs a terminal stage lock-up control by executing a control routine shown in FIG. 2. In the terminal stage lock-up control, controller 5 increases lock-up differential pressure command value T1 with time to establish the lock-up state of torque converter 2. The terminal stage lock-up control is carried out by a so-called open control and conducted at a terminal stage of the lock-up control which is started at moment t2 at which actual slip rotation speed |Ne−Nt| is decreased to predetermined slip rotation speed value ΔNs for the first time as shown in FIG. 3. The terminal stage lock-up control is conducted in a late part of the lock-up region of the torque converter operating region as shown in FIG. 3. Accordingly, the lock-up control that is conducted before moment t2 may be not limited to a specific one.

Here, actual slip rotation speed |Ne−Nt| of torque converter 2 is a speed difference between engine speed Ne, i.e., torque converter input rotation speed, and turbine rotation speed Nt, i.e., torque converter output rotation speed, which are detected by engine speed sensor 22 and turbine speed sensor 23. Predetermined slip rotation speed value ΔNs is an upper limit within a range of slip rotation speed of torque converter 2 in which lock-up clutch 2c can be prevented from suffering from a troublesome increase in engagement shock (lock-up shock).

Figure 2:
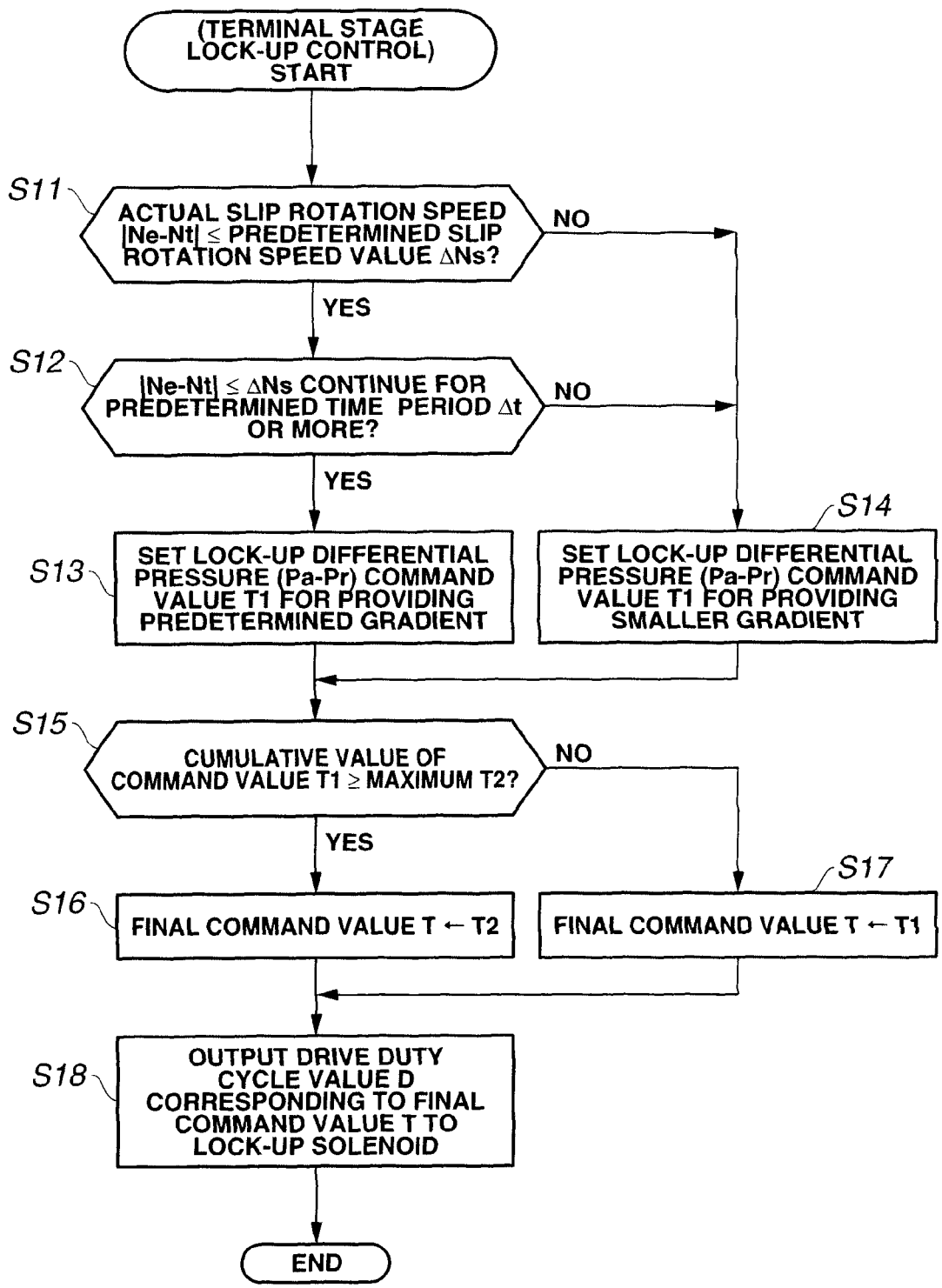
FIG. 2 is a flow chart illustrating a control routine of a terminal stage lock-up control which is performed by a controller in the embodiment.
Figure 3:
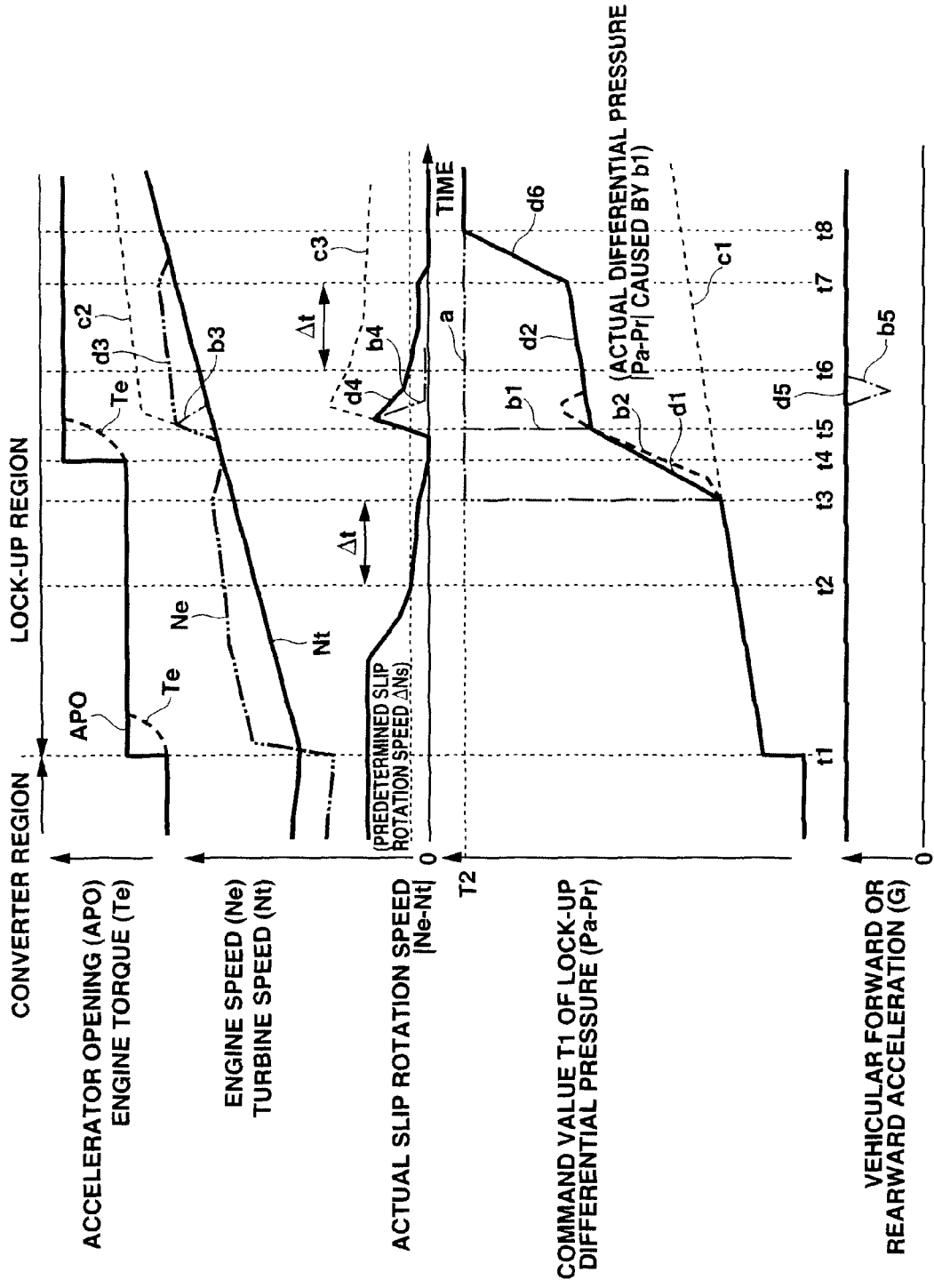
FIG. 3 is a time chart illustrating operation of the lock-up control system of the embodiment as compared to a conventional lock-up control system.

Referring to FIG. 2, the control routine of the terminal stage lock-up control will now be explained. This control routine is repeatedly executed at a predetermined cycle. As shown in FIG. 2, the routine starts and goes to step S11 where controller 5 judges whether or not actual slip rotation speed |Ne−Nt| of torque converter 2 is decreased from a value larger than predetermined slip rotation speed value ΔNs to predetermined slip rotation speed value ΔNs or less. Specifically, controller 5 judges whether or not actual slip rotation speed |Ne−Nt| of torque converter 2 is decreased to predetermined slip rotation speed value ΔNs or less at moment t2 by controlling the engagement operation of lock-up clutch 2c from moment t1 at which the torque converter operating region is shifted from the converter region to the lock-up region as shown in FIG. 3. When the answer to step S11 is in the affirmative indicative that actual slip rotation speed |Ne−Nt| of torque converter 2 is decreased to predetermined slip rotation speed value ΔNs or less, it is judged that torque converter 2 is advanced toward the lock-up state without undergoing a troublesome increase in engagement shock of lock-up clutch 2c even when the rapid engagement operation of lock-up clutch 2c is carried out. Then, the routine proceeds to step S12.

At step S12, controller 5 judges whether or not the condition that actual slip rotation speed |Ne−Nt| of torque converter 2 is decreased to predetermined slip rotation speed value ΔNs or less continues during predetermined time period Δt or more. In other words, it is judged that at moment t3 predetermined time period Δt has elapsed from moment t2, actual slip rotation speed |Ne−Nt| of torque converter 2 is kept at predetermined slip rotation speed value ΔNs or less. Here, predetermined time period Δt is a time period necessary to confirm that actual slip rotation speed |Ne−Nt| of torque converter 2 is stabilized at predetermined slip rotation speed value ΔNs or less. Predetermined time period Δt is a margin of time for normal judgment which is set so as not to erroneously judge that actual slip rotation speed |Ne−Nt| of torque converter 2 is stabilized at predetermined slip rotation speed value ΔNs or less when actual slip rotation speed |Ne−Nt| provisionally fluctuates in the vicinity of predetermined slip rotation speed value ΔNs due to disturbance or being in a transient stage of the lock-up control.

When the answer to step S12 is in the affirmative indicative that the condition of |Ne−Nt|≦ΔNs is continuously kept during predetermined time period Δt or more, the routine proceeds to step S13. At step S13, controller 5 sets lock-up differential pressure command value T1 so as to provide a predetermined gradient of lock-up differential pressure command value T1, namely, a predetermined rate of increase in lock-up differential pressure command value T1 with time, as indicated solid line "d1" in FIG. 3. The predetermined gradient is larger than a smaller gradient of lock-up differential pressure command value T1 which is set until actual slip rotation speed |Ne−Nt| is decreased to predetermined slip rotation speed value ΔNs or less. The smaller gradient of lock-up differential pressure command value T1 is provided until moment t3, specifically, for the time period from moment t1 to moment t3, as shown in FIG. 3.

Here, the smaller gradient of lock-up differential pressure command value T1 is set within a range in which the speed of engagement operation of lock-up clutch 2c determined by the smaller gradient becomes as fast as possible without causing a troublesome engagement shock. In other words, the smaller gradient of lock-up differential pressure command value T1 is set within a range in which the engagement operation of lock-up clutch 2c is promoted without causing an engagement shock in the lock-up clutch. Further, the predetermined gradient of lock-up differential pressure command value T1 as indicated solid line "d1" in FIG. 3 is set such that change in actual differential pressure which is supplied to lock-up clutch 2c in response to lock-up differential pressure command value T1 follows up change in lock-up differential pressure command value T1. That is, the predetermined gradient of lock-up differential pressure command value T1 is set to a maximum value within a range in which change in the actual differential pressure can follow up change in lock-up differential pressure command value T1.

When the answer to step S11 is in the negative, it is judged that actual slip rotation speed |Ne−Nt| of torque converter 2 exceeds predetermined slip rotation speed value ΔNs. For instance, it is judged that increase in accelerator opening APO is caused by the vehicle driver's depression of the accelerator pedal and thereby engine torque Te is raised as indicated at moment t4 in FIG. 3. Since the transition to the lock-up state of torque converter 2 is not completed at the time, a rise of engine speed Ne is caused so that actual slip rotation speed |Ne−Nt| of torque converter 2 becomes larger than predetermined slip rotation speed value ΔNs again as indicated at moment t5 in FIG. 3. Then, the routine proceeds to step S14.

When the answer to step S12 is in the negative indicative that the condition of |Ne−Nt|≦ΔNs does not continue during predetermined time period Δt or more even though the condition of |Ne−Nt|≦ΔNs is provisionally established, the routine proceeds to step S14.

At step S14, controller 5 sets lock-up differential pressure command value T1 so as to provide a smaller gradient that is smaller than the predetermined gradient. When it is judged that actual slip rotation speed |Ne−Nt| of torque converter 2 exceeds predetermined slip rotation speed value ΔNs due to the depression of the accelerator pedal, lock-up differential pressure command value T1 is set so as to provide the smaller gradient indicated by solid line "d2" in FIG. 3 which is smaller than the predetermined gradient indicated by solid line "d1" in FIG. 3. The smaller gradient of lock-up differential pressure command value T1 as indicated by solid line "d2" in FIG. 3 may be equal to the gradient of lock-up differential pressure command value T1 which is provided until moment t3, namely, for the time period from moment t1 to moment t3 as shown in FIG. 3. That is, the smaller gradient of lock-up differential pressure command value T1 may be equal to the gradient of lock-up differential pressure command value T1 that is set until actual slip rotation speed |Ne−Nt| is decreased to predetermined slip rotation speed value ΔNs or less.

At step S15, controller 5 judges whether or not a cumulative value of lock-up differential pressure command value T1 set at step S13 and step S14 is not less than maximum value T2 of lock-up differential pressure (Pa−Pr). Maximum value T2 is set at a value of lock-up differential pressure (Pa−Pr) which is necessary to bring lock-up clutch 2c into the full engagement state, i.e., the lock-up state.

When the answer to step S15 is in the affirmative, it is judged that the cumulative value of lock-up differential pressure command value T1 is not less than maximum value T2 as indicated at moment t8 and afterward in FIG. 3. The routine proceeds to step S16. At step S16, controller 5 sets final command value T of lock-up differential pressure (Pa−Pr) at maximum value T2. When the answer to step S15 is in the negative, it is judged that the cumulative value of lock-up differential pressure command value T1 is less than maximum value T2 as indicated for a time period from moment t1 to moment t8 in FIG. 3. The routine proceeds to step S17. At step S17, controller 5 sets final command value T of lock-up differential pressure (Pa−Pr) at command value T1.

Then, the routine proceeds to step S18 where controller 5 outputs solenoid-drive duty cycle value D that corresponds to final command value T set at step S16 and step S17, to lock-up solenoid valve 4 shown in FIG. 1.

The above-described terminal stage lock-up control has the following functions and effects. As shown in FIG. 3, at moment t3 at which predetermined time period Δt has elapsed from moment t2 at which actual slip rotation speed |Ne−Nt| of torque converter 2 is decreased to predetermined slip rotation speed value ΔNs, the gradient of lock-up differential pressure command value T1 that is increased with time is switched from the predetermined gradient indicated by solid line "d1" which is larger than the smaller gradient which is provided until actual slip rotation speed |Ne−Nt| is decreased to predetermined slip rotation speed value ΔNs or less. Thus, lock-up differential pressure command value T1 is increased from moment t3 with the predetermined gradient larger than the smaller gradient. As a result, according to the terminal stage lock-up control, reduction of the lock-up time can be realized as compared to the case where lock-up differential pressure command value T1 is continuously increased to maximum value T2 with the smaller gradient that is provided until actual slip rotation speed |Ne−Nt| is decreased to predetermined slip rotation speed value ΔNs.

Further, even when accelerator opening APO is increased at moment t4 and a rise of actual slip rotation speed |Ne−Nt| of torque converter 2 is caused in the course of increasing lock-up differential pressure command value T1 with the predetermined gradient, a time period that is required to decrease actual slip rotation speed |Ne−Nt| to zero can be reduced. This is because an absolute value of lock-up differential pressure command value T1 which is increased from moment t3 with the predetermined gradient is larger than an absolute value of lock-up differential pressure command value T1 which is increased from moment t3 with the smaller gradient regardless of the drop of actual slip rotation speed |Ne−Nt| to predetermined slip rotation speed value ΔNs. Therefore, even when the gradient of lock-up differential pressure command value T1 is switched from the predetermined gradient to the smaller gradient indicated by solid line "d2" at moment t5 as shown in FIG. 3, the time period that is required to decrease actual slip rotation speed |Ne−Nt| to zero can be reduced.

Further, even after actual slip rotation speed |Ne−Nt| of torque converter 2 is decreased from the value larger than predetermined slip rotation speed value ΔNs to predetermined slip rotation speed value ΔNs at moment t2 in FIG. 3, when depressing the accelerator pedal at moment t4 in FIG. 3, actual slip rotation speed |Ne−Nt| becomes larger than predetermined slip rotation speed value ΔNs again at moment t5 in FIG. 3. In such a case, the gradient of lock-up differential pressure command value T1 is switched at moment t5 from the predetermined gradient indicated by solid line "d1" in FIG. 3 to the smaller gradient indicated by solid line "d2" in FIG. 3 which is identical to the smaller gradient provided until moment t3. As a result, in a case where the condition of |Ne−Nt|>ΔNs is established under the terminal-stage lock-up control, lock-up differential pressure command value T1 is gradually increased with the smaller gradient indicated by solid line "d2" so that the engagement operation of lock-up clutch 2c is gradually carried out. Further, the condition of |Ne−Nt|>ΔNs is also established for a time period from moment t1 at which the operating region of torque converter 2 is shifted from the converter region to the lock-up region, to moment t3. Therefore, the engagement operation of lock-up clutch 2c is gradually carried out for the time period from moment t1 to moment t3.

Owing to the changeover of the gradient of lock-up differential pressure command value T1 from the predetermined gradient to the smaller gradient, engine speed Ne, i.e., torque converter input speed, can gradually approach toward turbine speed Nt, i.e., torque converter output speed, as indicated by two-dot chain line "d3" in FIG. 3, as compared to a rapid approach of engine speed Ne as indicated by alternate long and short dash line "b3" in FIG. 3. Therefore, actual slip rotation speed |Ne−Nt| of torque converter 2 can be gradually decreased to zero as indicated by solid line "d4" in FIG. 3 in contrast to an abrupt drop of actual slip rotation speed |Ne−Nt| as indicated by alternate long and short dash line "b4" in FIG. 3. As a result, the engagement shock or lock-up shock of lock-up clutch 2c which might occur due to the accelerator pedal depression conducted at moment t4, can be prevented as seen from a change with time in vehicular forward or rearward acceleration G as indicated by solid line "d5" in FIG. 3.

Further, according to the terminal stage lock-up control as described above, lock-up differential pressure command value T1 is not abruptly and stepwisely increased as indicated by alternate long and short dash line "b1" in FIG. 3 as conducted in the conventional lock-up control device. According to the terminal stage lock-up control of the above embodiment, lock-up differential pressure command value T1 is increased with the predetermined gradient as indicated by solid line "d1" in FIG. 3. This results in preventing a delayed response to the lock-up control command which might occur upon abruptly and stepwisely increasing lock-up differential pressure command value T1 as indicated by alternate long and short dash line "b1" in FIG. 3. Further, even when at moment t5 at which actual slip rotation speed |Ne−Nt| of torque converter 2 exceeds predetermined slip rotation speed value ΔNs again, the gradient of lock-up differential pressure command value T1 is switched from the predetermined gradient indicated by solid line "d1" in FIG. 3 to the smaller gradient indicated by solid line "d2" in FIG. 3, it is possible to suppress overshoot in controlled variable as indicated by broken line "b2" in FIG. 3 which might occur in the conventional lock-up control. Therefore, it is also possible to avoid occurrence of the lock-up shock due to the overshoot in controlled variable.

Further, at moment t6 at which actual slip rotation speed |Ne−Nt| of torque converter 2 is gradually decreased to predetermined slip rotation speed value ΔNs as indicated by solid line "d4" in FIG. 3, the routine shown in FIG. 2 proceeds from step S11 to step S12. When at step S12 it is judged that the condition of |Ne−Nt|≦ΔNs is continuously kept during predetermined time period Δt from moment t6 to moment t7 as indicated in FIG. 3, the routine shown in FIG. 2 proceeds from step S12 to step S13. Accordingly, at moment t7, the gradient of lock-up differential pressure command value T1 is switched again from the smaller gradient indicated by solid line "d2" in FIG. 3 to the larger gradient indicated by solid line "d6" in FIG. 3 which is larger than the smaller gradient indicated by solid line "d2". The larger gradient is equal to the predetermined gradient indicated by solid line "d1" in FIG. 3 which is provided for the time period from moment t3 to moment t5. As a result, reduction of the lock-up time can be realized. Further, the condition of |Ne−Nt|≦ΔNs is established at moment t7 and afterward, whereby a troublesome engagement shock of lock-up clutch 2c can be prevented even when the gradient of lock-up differential pressure command value T1 is switched to the larger gradient indicated by solid line "d6" in FIG. 3.

Further, the predetermined gradient of lock-up differential pressure command value T1 which is provided for the time period from moment t3 to moment t5 and provided from moment t7, is set such that change in actual differential pressure that is supplied to lock-up clutch 2c in response to lock-up differential pressure command value T1 follows up change in lock-up differential pressure command value T1. As a result, the lock-up time can be most effectively reduced within a range in which overshoot in controlled variable for the lock-up control is prevented.

Further, in this embodiment, the smaller gradient of lock-up differential pressure command value T1 which is provided for the time period from moment t5 to moment t7 is equal to the gradient of lock-up differential pressure command value T1 which is provided until moment t3, specifically, for the time period from moment t1 to moment t3. That is, the smaller gradient of lock-up differential pressure command value T1 is equal to the gradient of lock-up differential pressure command value T1 which is provided until actual slip rotation speed |Ne−Nt| of torque converter 2 is decreased to predetermined slip rotation speed value ΔNs or less for the first time after the torque converter operating region is shifted from the converter region to the lock-up region. Further, the smaller gradient of lock-up differential pressure command value T1 is set within a range in which engagement of lock-up clutch 2c is promoted as fast as possible without causing an engagement shock in lock-up clutch 2c. As a result, it is possible to suppress adverse increase in engagement capacity of the lock-up control system and occurrence of an engagement shock of lock-up clutch 2c and perform the engagement operation of lock-up clutch 2c as fast as possible. This serves for attaining a better balance between inhibition of the lock-up shock and provision of a good response to the lock-up control command. Further, it is remarkably advantageous to readily set lock-up differential pressure command value T1 that is provided for the time period from moment t5 to moment t7.

Furthermore, in this embodiment, when actual slip rotation speed |Ne−Nt| of torque converter 2 is decreased to predetermined slip rotation speed value ΔNs or less and the condition of |Ne−Nt|≦ΔNs is continuously established during predetermined time period Δt, the gradient of lock-up differential pressure command value T1 is switched from the smaller gradient which is provided until actual slip rotation speed |Ne−Nt| is decreased to predetermined slip rotation speed value ΔNs or less, to the predetermined gradient larger than the smaller gradient. Namely, in this embodiment, at moment t2 and moment t6 at which actual slip rotation speed |Ne−Nt| is dropped to predetermined slip rotation speed value ΔNs as shown in FIG. 3, the gradient of lock-up differential pressure command value T1 is not switched from the smaller gradient to a larger gradient that is larger than smaller gradient. At both moment t3 and moment t7 at which predetermined time period Δt has elapsed from moment t2 and moment t6, respectively, the gradient of lock-up differential pressure command value T1 is switched from the smaller gradient which is provided for the time period from moment t1 to moment t3 and the time period from moment t5 to moment t7, to the predetermined gradient which is larger than the smaller gradient. Further, predetermined time period Δt is a time period necessary to confirm that actual slip rotation speed |Ne−Nt| of torque converter 2 is stabilized at predetermined slip rotation speed value ΔNs or less. As a result, it is possible to prevent erroneously judging that actual slip rotation speed |Ne−Nt| of torque converter 2 is stabilized at predetermined slip rotation speed value ΔNs or less when actual slip rotation speed |Ne−Nt| provisionally fluctuates in the vicinity of predetermined slip rotation speed value ΔNs due to disturbance or being in a transient stage of the lock-up control. Accordingly, it is possible to avoid unnecessarily switching the gradient of lock-up differential pressure command value T1 to the predetermined gradient and occurrence of hunting in the lock-up control command due to the erroneous judgment.

This application is based on prior Japanese Patent Application No. 2007-160437 filed on Jun. 18, 2007. The entire contents of the Japanese Patent Application No. 2007-160437 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is: ,

1. A lock-up control system configured to control a lock-up clutch in a torque converter which is disposed between input and output elements of the torque converter, the lock-up control system being configured to bring the torque converter into a lock-up state by controlling a lock-up differential pressure between a lock-up clutch apply pressure and a lock-up clutch release pressure, the lock-up control system comprising:
  a lock-up differential pressure generator configured to generate the lock-up differential pressure in response to a lock-up differential pressure command value; and
  a controller configured to control the lock-up differential pressure command value according to change in an actual slip rotation speed as a differential rotation speed between the input and output elements of the torque converter,
  wherein, when increasing the lock-up differential pressure command value with time to establish the lock-up state of the torque converter, the controller is programmed to:
  switch a gradient of the lock-up differential pressure command value from a first gradient to a predetermined gradient that is larger than the first gradient, when the actual slip rotation speed is decreased to a predetermined slip rotation speed value or to less than the predetermined slip rotation speed value; and
  switch the gradient of the lock-up differential pressure command value from the predetermined gradient to a second gradient that is smaller than the predetermined gradient, when the actual slip rotation speed exceeds the predetermined slip rotation speed value again after being decreased to the predetermined slip rotation speed value or to less than the predetermined slip rotation speed value.

2. The lock-up control system as claimed in claim 1, wherein the predetermined gradient is set such that change in an actual differential pressure supplied to the lock-up clutch in response to the lock-up differential pressure command value follows change in the lock-up differential pressure command value.

3. The lock-up control system as claimed in claim 1, wherein the second gradient is equal to the first gradient.

4. The lock-up control system as claimed in claim 1, wherein the first gradient is set within a range in which engagement of the lock-up clutch is promoted without causing an engagement shock in the lock-up clutch.

5. The lock-up control system as claimed in claim 1, wherein the controller is programmed such that the switching of the gradient of the lock-up differential pressure command value from the first gradient to the predetermined gradient is conducted at a moment at which a predetermined time period has elapsed from a moment at which the actual slip rotation speed is decreased to the predetermined slip rotation speed value, and the actual slip rotation speed is kept at the predetermined slip rotation speed value or at less than the predetermined slip rotation speed value during the predetermined time period.

6. The lock-up control system as claimed in claim 1, wherein the controller is further programmed to switch the gradient of the lock-up differential pressure command value from the second gradient to the predetermined gradient when the actual slip rotation speed is decreased to the predetermined slip rotation speed value or to less than the predetermined slip rotation speed value again after exceeding the predetermined slip rotation speed value.

7. The lock-up control system as claimed in claim 6, wherein the controller is programmed such that the switching of the gradient of the lock-up differential pressure command value from the second gradient to the predetermined gradient is conducted at a moment at which a predetermined time period has elapsed from a moment at which the actual slip rotation speed is decreased to the predetermined slip rotation speed value, and the actual slip rotation speed is kept at the predetermined slip rotation speed value or at less than the predetermined slip rotation speed value during the predetermined time period.

8. The lock-up control system as claimed in claim 5, wherein the predetermined time period is a time period necessary to confirm that the actual slip rotation speed is stabilized at the predetermined slip rotation speed value or at less than the predetermined slip rotation speed value.

9. The lock-up control system as claimed in claim 7, wherein the predetermined time period is a time period necessary to confirm that the actual slip rotation speed is stabilized at the predetermined slip rotation speed value or at less than the predetermined slip rotation speed value.

10. The lock-up control system as claimed in claim 1, wherein the first, predetermined, and second gradients have upward slopes at non-zero angles from vertical and horizontal axes.

11. A method of controlling a lock-up clutch in a torque converter which is disposed between input and output elements of the torque converter, the torque converter being brought into a lock-up state by a control of a lock-up differential pressure between a lock-up clutch apply pressure and a lock-up clutch release pressure which is generated in response to a lock-up differential pressure command value, wherein, when increasing the lock-up differential pressure command value with time to establish the lock-up state of the torque converter, the method comprises:

judging whether or not an actual slip rotation speed as a differential rotation speed between the input and output elements of the torque converter is decreased to a predetermined slip rotation speed value or to less than the predetermined slip rotation speed value;

setting the lock-up differential pressure command value such that a first gradient is provided until the actual slip rotation speed is judged to have decreased to the predetermined slip rotation speed value or to less than the predetermined slip rotation speed value;

setting the lock-up differential pressure command value such that a predetermined gradient larger than the first gradient is provided when the actual slip rotation speed is judged to have decreased to the predetermined slip rotation speed value or to less than the predetermined slip rotation speed value; and setting the lock-up differential pressure command value such that a second gradient smaller than the predetermined gradient is provided when the actual slip rotation speed is judged to have exceeded the predetermined slip rotation speed value again after setting the lock-up differential pressure command value such that the predetermined gradient has been provided.

12. The method as claimed in claim 11, wherein the predetermined gradient is set such that change in an actual differential pressure supplied to the lock-up clutch in response to the lock-up differential pressure command value follows change in the lock-up differential pressure command value.

13. The method as claimed in claim 11, wherein the second gradient is equal to the first gradient.

14. The method as claimed in claim 11, wherein the first gradient is set within a range in which engagement of the lock-up clutch is promoted without causing an engagement shock in the lock-up clutch.

15. The method as claimed in claim 11, further comprising judging whether or not the actual slip rotation speed is kept at the predetermined slip rotation speed value or at less than the predetermined slip rotation speed value during a predetermined time period or at a time period that is more than the predetermined time period, wherein when the actual slip rotation speed is judged to be kept at the predetermined slip rotation speed value or at less than the predetermined slip rotation speed value during the predetermined time period or at the time period that is more than the predetermined time period, the lock-up differential pressure command value that increases with time is set such that the predetermined gradient is provided.

16. The method as claimed in claim 15, wherein the predetermined time period is a time period necessary to confirm that the actual slip rotation speed is stabilized at the predeteimined slip rotation speed value or at less than the predetermined slip rotation speed value.

17. The method as claimed in claim 15, wherein the lock-up differential pressure command value is set such that the first gradient is provided until the actual slip rotation speed is judged to be kept at the predetermined slip rotation speed value or at less than the predetermined slip rotation speed value during the predetermined time period or at the time period that is more than the predetermined time period.

18. The method as claimed in claim 11, wherein the first, predeteimined, and second gradients have upward slopes at non-zero angles from vertical and horizontal axes.

* * * * *